(12) United States Patent
Araki et al.

(10) Patent No.: US 8,075,932 B2
(45) Date of Patent: Dec. 13, 2011

(54) FERMENTED FOOD AND ITS PREPARATION

(76) Inventors: Hiroshi Araki, Kakogawa (JP); Sato Araki, Kakogawa (JP); Yuri Araki, Adati-ku (JP)

( * ) Notice: Subject to any disclaimer, the term of this patent is extended or adjusted under 35 U.S.C. 154(b) by 754 days.

(21) Appl. No.: 12/073,172

(22) Filed: Feb. 29, 2008

(65) Prior Publication Data
US 2008/0199566 A1  Aug. 21, 2008

Related U.S. Application Data

(63) Continuation-in-part of application No. 10/990,315, filed on Nov. 17, 2004, now abandoned.

(30) Foreign Application Priority Data

Mar. 4, 2004 (JP) ................................ 2004-060879
Nov. 22, 2007 (JP) ................................ 2007-303141

(51) Int. Cl.
*A21D 2/00* (2006.01)

(52) U.S. Cl. ................ 426/18; 426/31; 426/34; 426/49; 426/60; 426/481; 426/523; 426/615; 426/618; 426/622; 426/656

(58) Field of Classification Search .................. 426/615, 426/523, 481, 656, 618, 622, 18, 31, 34, 426/49, 60
See application file for complete search history.

(56) References Cited

U.S. PATENT DOCUMENTS

| 2004/0033291 A1* | 2/2004 | Burgermeister et al. ........ 426/62 |
| 2005/0147725 A1* | 7/2005 | Miller ............................ 426/549 |
| 2005/0196515 A1 | 9/2005 | Araki et al. |
| 2006/0088574 A1 | 4/2006 | Manning et al. |

FOREIGN PATENT DOCUMENTS

| EP | 1 269 860 A | 1/2003 |
| JP | 7-184573 A | 7/1995 |
| JP | 11-75746 A | 3/1999 |
| JP | 2000-63286 A | 2/2000 |
| JP | 2003-180275 A | 7/2003 |
| JP | 2004-65236 A | 3/2004 |
| JP | 3687049 B | 6/2005 |

OTHER PUBLICATIONS

Jewell, D. et al., "The Oat and Wheat Bran Health Plan", 1989, Bantam Books, pp. 57, 71 and 210, New York.
Cottrell, E., "The Oats, Peas, Beans & Barley Cookbook", WoodBridge Press, CA, 1974, pp. 59-63, 65 and 70, Santa Barbara.
Gill, K., "Biochemistry of Low-Carbo/Low-Sugar Diet", http://www.dotparagon.com/misc/low_carb_diet.html, Mar. 6, 2000, 3 pages.
Agaston, A., "The South Beach Diet", 2003, pp. 8-11 and 17-23, Rodale Inc., New York, USA.
Atkins, R., "Dr. Atkins' New Diet Revolution" 2004, pp. 66-71, 88-93, 134-135 and 170-171, HarperCollins Publishers Inc., New York, USA.
Hosmer, C., "Carbohydrate Confusion", http://www.intelihealth.com, Feb. 24, 2004, 2 pages.

* cited by examiner

*Primary Examiner* — Helen F Heggestad
(74) *Attorney, Agent, or Firm* — Smith Patent Office

(57) ABSTRACT

A method of manufacturing yeast fermented food such as bread, noodle and pasta, comprises the steps of preparing a starting cooking composition contains as main component bran powder and/or soy bean protein powder, gluten powder for binding the main powder and milk or milk ingredient powder containing milk sugar and a molding agent for increasing viscosity of composition; subjecting a mixed cooking composition with yeast to a fermentation condition to make a wet dough composition containing substantially no glucide; and baking or dry-solidifying it.

7 Claims, No Drawings

FERMENTED FOOD AND ITS PREPARATION

CROSS REFERENCE TO RELATED APPLICATION

This application is a continuation-in-part application of U.S. patent application Ser. No. 10/990,315 filed on Nov. 17, 2004, now abandoned. The disclosure of U.S. patent application Ser. No. 10/990,315 is hereby incorporated by reference.

BACKGROUND OF THE INVENTION

1. Field of the Invention

The present invention relates to a fermented flour diet food containing substantially no carbohydrate or glucide which can be applied to a bread, doughnut, pasta, noodle and so on.

2. Description of the Related Art

Conventionally, as the fermented flour food, many kinds of breads and cookies using flour of whole grain such as wheat and rye have been come into the market, but these allow nothing but to take large amount of dietary fibers compared to the products using purified flour, and have little changes in the contents of starch. Compared to this, a fermented flour food containing no carbohydrate is proposed for suppressing intake of carbohydrate while using fibers, all kinds of minerals, or vitamins contained in wheat bran and oatmeal husk or rice bran.

As WHO (World Health Organization) points out, obesity is epidemically widely spread in the world of today and causes increases in diabetes and high blood pressure in addition to heart and vascular diseases. From the nineteen-seventies, the United States of America has promoted a low-fat diet having low calories so as to prevent the obesity, and most people have been practiced, but the population having obesity has been rather increased than before and reached up to the present time.

That is, so far, FDA (Food and Drug Administration) has created so-called food pyramid to instruct healthy diets and constructed the pyramid by positioning carbohydrate (60 percent of the entire meals) at the bottom of the pyramid (the most important food), positioning protein there above, and then positioning fat further above, so that the carbohydrate has been mostly emphasized. However, as described above, the population having obesity has been rather increased as the intake of the carbohydrate has been increased and the reduction of caloric value has been progressed. In response to the reversed situations, Dr. Atkins has advocated a low carbohydrate diet for 30 years (reference to Dr. Atkins New Diet Revolution of Robert C. Atkins M.D. published by Avon books New York).

Recently, except for Dr. Atkins, the number of people who support the low carbohydrate diet typically including Dr. Agatston (the writer of South Beach Diet) has been increased, and there was a television debate for diet on May, 2003. Since then, in the United States of America, the people who do not eat bread portion of hamburger, pizza or cookies has been rapidly increased. Also, in Japan, the populations having obesity or diabetes and its estimated groups have been rapidly increased, and there was needs to limit the intake of glucide in particular a refined flour or white rice (reference to The South Beach Diet of Dr. Arthur Agatston M.D. published by Rodale).

SUMMARY OF THE INVENTION

In order to actively suppress the intake of glucide, and enable people to intake dietary fibers (usually deficient), for preventing an adult disease such as obesity, diabetes, hyperlipemia and high blood pressure, it is proposed to use the wheat bran and rice bran effectively which take most parts among food industrial wastes.

It is further proposed to use gluten as a binder material between the roasted wheat bran or rice bran, but enough improvement of dough formability cannot be obtained in the bran composition.

Therefore, use of husk powder of plantago seed (psyllium) is proposed to make the products to be obtained to have a water retentive characteristic and texture and many kinds of foods has been proposed (Japanese Patent No. 3,687,049).

However, we have found that the food made from composition including the bran and the gluten does not have a good taste. It was our big misunderstanding in our research of the diet food composition to forget what is one of the most important things in the diet food. Generally speaking, everybody tends to forget a fact that taste is one of the most important things in food under the condition that nutrition of the diet food is important for health. Therefore, we have been researching to propose a non carbohydrate food provided with good taste from combination of the bran and gluten.

After our sharp research, we firstly found that it is important that fermentation and addition of milk or milk component such as skim milk can improve taste of the bran and gluten composition, but yeast fermentation process needs sugar. Using sugar is against the spirit of making non carbohydrate diet food from the bran and gluten composition. Further research gives us some hints that, although milk or milk component itself cannot help yeast fermentation, glucose and galactose can be obtained by enzyme decomposition or zymolysis of milk sugar contained in milk or milk component and the sugar components can be used and consumed for fermentation of the bran and gluten composition. That is, fermentation and addition of milk or milk component synergistically act together under enzyme decomposition or zymolysis of milk sugar contained in milk or milk component to improve taste and consume sugar content, resulting in substantially no glucide and sugar contained diet food.

Therefore, from a first aspect of the present invention, there is provided a method of manufacturing yeast fermented foods with substantially no glucide, comprising:

a) preparing a starting cooking composition containing at least 1) one main powder selected from bran powder and soy bean protein powder, 2) gluten powder for binding the main powder and 3) milk or milk ingredient powder containing milk sugar and 4) a molding agent for increasing viscosity of composition;

b) mixing the starting cooking composition with yeast or dry yeast powder and water to get a wet dough composition containing substantially no glucide and subjecting the dough composition to a fermentation condition; and c) baking or dry-solidifying the fermented dough composition after shaping it in a proper shape.

In a preferred embodiment according to the present invention, the milk or milk ingredient powder contains glucose and galactose obtained by enzyme decomposition or zymolysis of milk sugar. The milk ingredient is obtained from milk or skim milk and milk sugar in the milk ingredient is decomposed to glucose and galactose by catabolic enzyme comprising β-glucosidase. Therefore, it is recommendable to add the treated milk ingredient containing glucose and galactose to the starting cooking composition or to add the milk or milk ingredient with the catabolic enzyme to the starting cooling composition. The starting cooking composition may further comprise bean-curd refuse powder and/or rice bran powder and also may comprise eggs and oils. In the starting cooking composition, the proportion of the bran powder or soy bean protein powder to gluten in the starting cooking composition may be in a ratio of 8:2 to 5:5 (by weight), preferably 7:3 to 6:4. The molding agent includes psyllium powder of 0.01 to 0.5% (by weight) of the starting cooking composition.

DESCRIPTION OF THE PREFERRED EMBODIMENT

Hereinafter, the present invention will be explained with the following examples in detail.

The bran may be roasted for omitting glucide contained therein. Generally, the bran roasted should be milled and passed through 40 to 60 mesh. Nano powder having as fine particle as possible can improve taste of food. The mixture weight ratio of the roasted bran or soy bean protein and the gluten may be 8:2 to 5:5, preferably 7:3 to 6:4. A part, preferably less than 30 weight % of the wheat bran or soy bean protein may be substituted by rice bran or soybean fibers for suppressing increase of blood sugar level.

The molding agent for improving composition formability includes psyllium powder, sodium Alginate, Xanthan gum, Guar gum, Pectin, Glucomannan, Arabic gum and so on and the weight % of the molding agent to the starting cooking composition may be 0.05 to 0.5, preferably 0.3 to 0.5.

The milk ingredient is made from milk or milk component such as skim milk. The milk may include any milk components from the mammals. The milk sugar in the milk ingredient can be decomposed by milk sugar decompose enzyme such as β-galactosidase to Galactose and Glucose. In a preferred embodiment, the milk sugar in the milk or milk ingredient to be used may be decomposed to galactose and glucose and then added to the bran and gluten composition.

In order to improve flavor or nutrition, oils and eggs may be added to the start cooking composition. As oil, butter or sesame oil and so on can be used. It is preferable that the butter is used for the wheat bran. Moreover, herbs such as coriander, cocoa, cinnamon and so on may be used to give a better flavor, and a sweetener besides carbohydrate such as stevia and aspartame may be properly added.

The inventive bread and doughnut composition comprises a mixture of roasted bran and gluten at a ratio of 8:2 to 5:5 and blended with a molding agent, milk containing β-galactosidase and yeast powder to get a wet dough composition. After fermentation, non glucide dough composition is shaped into a proper shape and baked, resulting in a finished bread food. The milk containing β-galactosidase can be prepared as follows.

1) providing 5 to 10 weight % of skim milk aqueous liquid
2) adding 2 to 5 unit/ml of lactase Y-AO (made in YAKURT of Japan) thereto
3) incubating the skim milk liquid for 2 to 4 hours to decompose the milk sugar On the other hand, the inventive pasta composition comprises a mixture of roasted bran and gluten at a ratio of 8:2 to 5:5 and blended with a molding agent, milk containing β-galactosidase and yeast powder to get a wet dough composition. After fermentation, non glucide dough composition is shaped into a proper shape and dry-solidified, resulting in a finished pasta food.

According to the present invention, there is provided a yeast fermented flour food containing substantially no glucide by using the bran or soy bean protein with gluten. In the inventive bran composition, gluten acts for binding the bran powder and milk ingredient acts for improving taste. Although the milk ingredient includes milk sugar, the milk sugar can be decomposed to galactose and glucose which is consumed by yeast fermentation process. Therefore, according to the present invention, fermentation can be carried out without additional sugar and no glucide flour food can be provided by fermentation without additional sugar, so that good taste flour food standing comparison with a conventional flour food containing a lot of carbohydrate can be obtained.

According to the present invention, the intake of the carbohydrate can be suppressed even if people eat a flour food as usual, the blood sugar level is lowered by the continuous intake of the product and bowel movement is proved.

As easily understanding the essence of invention from the above explanation, the skill in the art can modify the invention without depart from the scope of the claimed invention by using the dough composition comprising the bran and gluten as a start cooking material and using decomposition of milk sugar and also yeast fermentation without additional sugar.

EXAMPLE 1

600 g of roasted wheat bran and 400 g of gluten powder were mixed and then further mixed with 4 g of psyllium powder to obtain a starting cooking composition 1 Kg.

To 100 weight parts of the starting cooking composition, there are added 3 weight parts of yeast powder, 1 egg/100 g starting cooking composition, 10 weight parts of butter and also a predetermined volume of milk or skim milk water treated by β-galactosidase while adjusting hardness of the resulting dough composition. The resulting wet dough composition was shaped into a proper shape (90 g/unit) and kept at a room temperature for 30 minutes. Then the unit dough is baked at 200 to 210° C. for 10 minutes to get a bread food containing substantially no glucide and sugar.

EXAMPLE 2

400 g of roasted wheat bran, 100 g of roasted rice bran and 500 g of gluten powder were mixed and then further mixed with 1 g of psyllium powder to obtain a starting cooking composition 1 Kg.

To 100 weight parts of the start cooking composition, there are added 3 weight parts of yeast powder, 1 egg/100 g start cooking composition, 10 weight parts of butter and also a predetermined volume of milk or skim milk water treated by β-galactosidase while adjusting hardness of the resulting dough composition. The resulting wet dough composition was shaped into a proper shape (90 g/unit) and kept at a room temperature for 30 minutes. Then the unit dough is baked at 210° C. for 12 minutes to get a bread food containing substantially no glucide and sugar.

EXAMPLE 3

600 g of soy bean protein and 400 g of gluten powder were mixed and then further mixed with 4 g of psyllium powder to obtain a starting cooking composition 1 Kg.

To 100 weight parts of the start cooking composition, there are added 3 weight parts of yeast powder, 1 egg/100 g start cooking composition, 10 weight parts of butter and also a predetermined volume of milk or skim milk water treated by β-galactosidase while adjusting hardness of the resulting dough composition. The resulting wet dough composition was shaped into a proper shape (90 g/unit) and kept at a room temperature for 30 minutes. Then the unit dough is dry-solidified to get a needle pasta food containing substantially no glucide and sugar.

EXAMPLE 4

300 g of roasted wheat bran, 300 g of soy bean protein and 400 g of gluten powder were mixed and then further mixed with 1 g of psyllium powder to obtain a start cooking composition 1 Kg.

To 100 weight parts of the starting cooking composition, there are added 3 weight parts of yeast powder, 1 egg/100 g start cooking composition, and also a predetermined volume of milk or skim milk water treated by β-galactosidase while adjusting hardness of the resulting dough composition. The resulting wet dough composition was shaped into a proper shape (90 g/unit) and kept at a room temperature for 30 minutes. Then the unit dough is dry-solidified to get a flat band pasta food containing substantially no glucide and sugar.

As explained above, the inventive product has a good taste even if the bran is used and has no milk sugar even if the milk or milk ingredient is used, resulting in provision of substantially no glucide contained flour food such as bread and pasta. Therefore, the inventive flour food is effective to prevent fatness, high blood sugar level and hypercholesterolemia.

What is claimed is:

1. A method of manufacturing yeast fermented foods, comprising:
    a) preparing a starting cooking composition containing at least 1) one main powder selected from bran powder and soy bean protein powder, 2) gluten powder for binding the main powder and 3) a milk or milk ingredient powder containing milk sugar, wherein the milk or milk ingredient is decomposed into a compound containing a glucose and galactose by a catabolic enzyme comprising β (beta)-glucosidase, and 4) an agent for increasing viscosity of composition;
    b) mixing the starting cooking composition with yeast or dry yeast powder and water to get a wet dough composition and subjecting the dough composition to a fermentation condition, whereby the yeast fermentation is carried out with glucose and galactose obtained by the decomposition of milk sugar in the milk or milk ingredient; and
    c) baking or dry-solidifying the fermented dough composition after shaping it in a proper shape.

2. The method of manufacturing yeast fermented foods according to claim 1, wherein the milk ingredient is obtained from milk or skim milk and the milk sugar in the milk ingredient is decomposed to glucose and galactose by the catabolic enzyme comprising β-glucosidase and adding the treated milk ingredient containing glucose and galactose to the starting cooking composition.

3. The method of manufacturing yeast fermented foods according to claim 1, wherein the starting cooking composition further at least comprises a bean-curd refuse powder and a rice bran powder.

4. The method of manufacturing yeast fermented foods according to claim 1, wherein the proportion of the bran powder or soy bean protein powder to gluten in the starting cooking composition is in a ratio of 8:2 to 5:5 (by weight).

5. The method of manufacturing yeast fermented foods according to claim 1, wherein the agent includes psyllium powder, sodium Alginate, Xanthan gum, Guar gum, Pectin, Glucomannan, and Arabic gum.

6. The method of manufacturing yeast fermented foods according to claim 1, wherein the starting cooking composition further comprises eggs or oils.

7. A method of manufacturing yeast fermented foods, comprising:
    a) preparing a starting cooking composition containing at least 1) one main powder selected from bran powder and soy bean protein powder, 2) gluten powder for binding the main powder and 3) a milk or milk ingredient powder containing milk sugar, wherein the milk or milk ingredient is decomposed into a compound containing a glucose and galactose by a catabolic enzyme comprising β (beta)-glucosidase, and 4) an agent for increasing viscosity of composition;
    b) mixing the starting cooking composition with yeast or dry yeast powder and water to get a wet dough composition and subjecting the dough composition to a fermentation condition; and
    c) baking or dry-solidifying the fermented dough composition after shaping it in a proper shape, and
    wherein the starting cooking composition further comprises bean-curd refuse powder and/or rice bran powder, and
    wherein the agent includes at least one of psyllium powder, sodium Alginate, Xanthan gum, Guar gum, Pectin, Glucomannan, and Arabic gum; and
    whereby the yeast fermented food produced is substantially without any glucide.

* * * * *